(12) United States Patent
Srivastav et al.

(10) Patent No.: US 9,745,078 B2
(45) Date of Patent: Aug. 29, 2017

(54) SYSTEMS AND METHODS OF PRECISION LANDING FOR OFFSHORE HELICOPTER OPERATIONS USING SPATIAL ANALYSIS

(71) Applicant: Honeywell International Inc., Morris Plains, NJ (US)

(72) Inventors: Amit Srivastav, Karnataka (IN); John Hajdukiewicz, Minneapolis, MN (US); Sreedhar Garbham, Telengana (IN); Raman Srinivasan, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/012,728

(22) Filed: Feb. 1, 2016

(65) Prior Publication Data
US 2017/0217605 A1    Aug. 3, 2017

(51) Int. Cl.
*B64D 45/08* (2006.01)
*G01S 19/15* (2010.01)
(Continued)

(52) U.S. Cl.
CPC ............ *B64D 45/08* (2013.01); *B64D 45/04* (2013.01); *G01S 13/90* (2013.01); *G01S 19/15* (2013.01);
(Continued)

(58) Field of Classification Search
None
See application file for complete search history.

(56) References Cited

U.S. PATENT DOCUMENTS

| 6,377,892 | B1 * | 4/2002 | Johnson | G01C 21/00 342/357.31 |
|---|---|---|---|---|
| 8,019,490 | B2 | 9/2011 | Ferren et al. | |

(Continued)

FOREIGN PATENT DOCUMENTS

| DE | 102008022838 | 11/2009 |
|---|---|---|
| WO | 9004795 | 5/1990 |
| WO | 2006050347 | 5/2006 |

OTHER PUBLICATIONS

Korn et al., "A System is More than the Sum of Its Parts—Conclusion of DLR's Enhanced Vision Project 'Advise-Pro'", "25th Digital Avionics Systems Conference", Oct. 15, 2006, pp. 1-8.

(Continued)

*Primary Examiner* — Leon-Viet Nguyen
(74) *Attorney, Agent, or Firm* — Fogg & Powers LLC

(57) ABSTRACT

Systems and methods of precision landing in adverse conditions are provided. In one embodiment, a precision landing system comprises a vehicle including: a receiver configured to receive position information for structures and a landing zone of a landing site and a processor coupled to a memory, the memory includes three-dimensional geometric structural information for a landing site. The processor configured to: receive the position information from the receiver; assign geographical coordinates to the three-dimensional geometric structural information using the position information for the structures and the landing zone of the landing site; send the three-dimensional geometric structural information and graphical rendering information to a display device. The vehicle further includes a display device, wherein the display device is configured to render and display a three-dimensional representation of the landing site in real-time (Continued)

based on the three-dimension geometric structural information and the graphical rendering information from the processor.

20 Claims, 5 Drawing Sheets

(51) Int. Cl.
    *G08G 5/00*     (2006.01)
    *G01S 13/90*     (2006.01)
    *G06T 15/00*     (2011.01)
    *B64D 45/04*     (2006.01)
    *B64F 1/18*     (2006.01)

(52) U.S. Cl.
    CPC .......... *G06T 15/005* (2013.01); *G08G 5/0047* (2013.01); *B64F 1/18* (2013.01); *G01S 2013/9064* (2013.01); *G06T 2200/04* (2013.01)

(56) References Cited

U.S. PATENT DOCUMENTS

| | | | |
|---|---|---|---|
| 8,286,477 B2 | 10/2012 | Anders | |
| 8,314,816 B2 | 11/2012 | Feyereisen et al. | |
| 8,354,951 B2 | 1/2013 | Guigne et al. | |
| 8,576,113 B1* | 11/2013 | Seah | G01S 13/913 342/33 |
| 8,892,357 B2 | 11/2014 | Feyereisen et al. | |
| 8,949,011 B2 | 2/2015 | Ford et al. | |
| 2007/0016371 A1 | 1/2007 | Waid et al. | |
| 2010/0228408 A1 | 9/2010 | Ford et al. | |
| 2012/0176497 A1* | 7/2012 | Shadmi | G01C 21/00 348/144 |
| 2012/0265375 A1* | 10/2012 | Dutton | B63G 11/00 701/16 |
| 2012/0326923 A1* | 12/2012 | Oehler | G01S 5/0284 342/357.29 |
| 2015/0259075 A1 | 9/2015 | Case et al. | |
| 2016/0133138 A1 | 5/2016 | Oldach et al. | |

OTHER PUBLICATIONS

European Patent Office, "Extended European Search Report from EP Application No. 17151689.1 dated Jun. 30, 2017", "from Foreign Counterpart of U.S. Appl. No. 15/012,728", dated Jun. 30, 2017, pp. 1-6, Published in: EP.

* cited by examiner

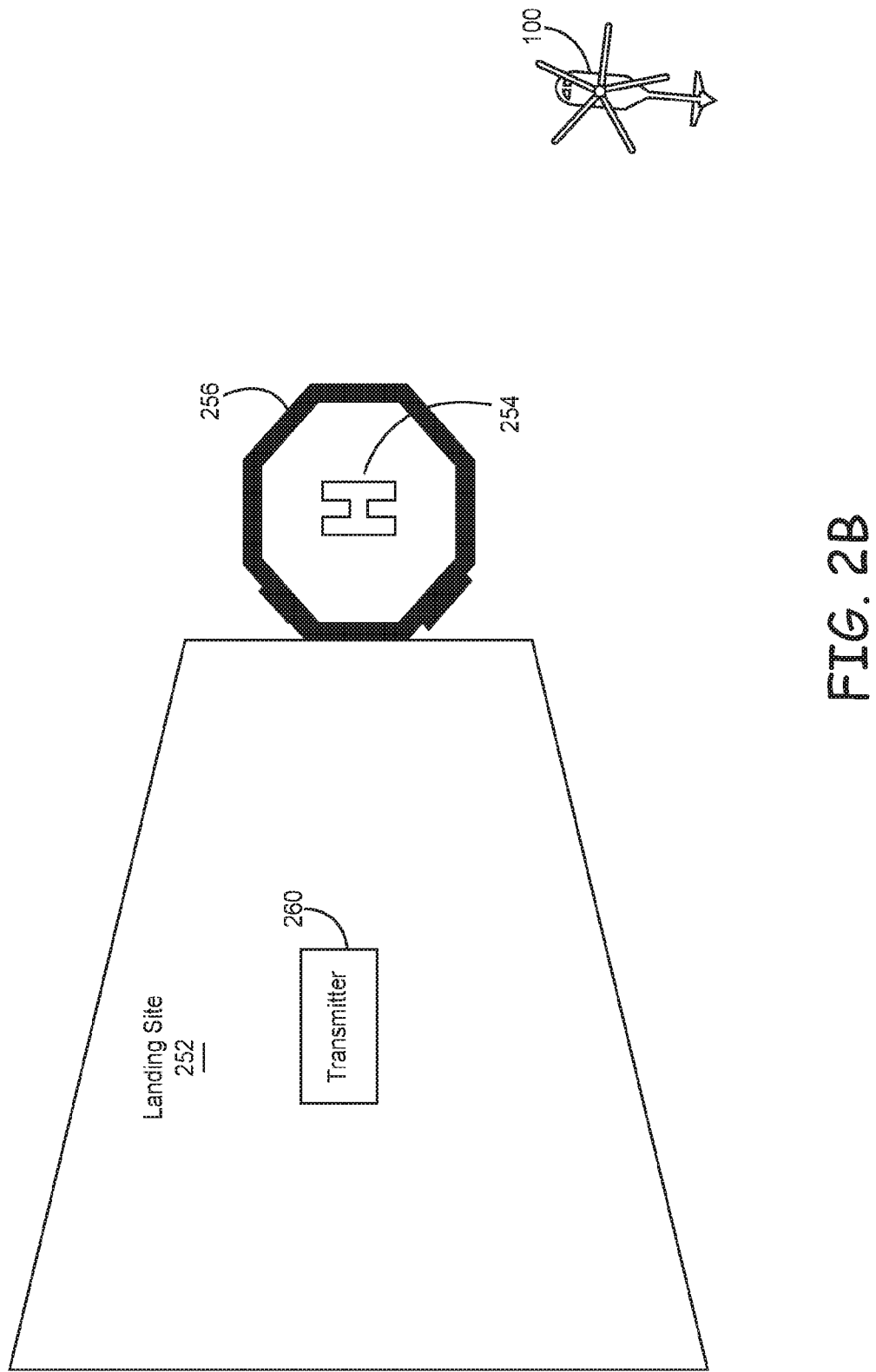

SYSTEMS AND METHODS OF PRECISION LANDING FOR OFFSHORE HELICOPTER OPERATIONS USING SPATIAL ANALYSIS

BACKGROUND

Offshore oil exploration has been supported by helicopter operations that enable the movement of staff and equipment to and from the shore. An offshore environment is challenging for helicopter operations from many perspectives, particularly during adverse weather conditions that cause low visibility. There have been numerous instances of helicopters landing on the wrong rig and aborting landing procedures due to insufficiencies with existing precision landing solutions. In particular, existing solutions do not provide comprehensive situational awareness to the pilot regarding the position of the oil rig and position of the helipad with reference to obstructions during adverse weather conditions.

For the reasons stated above and for other reasons stated below which will become apparent to those skilled in the art upon reading and understanding the specification, there is a need in the art for improved systems and methods for precision landings and takeoffs in adverse weather conditions.

SUMMARY

The embodiments of the present disclosure provide systems and methods for performing precision landings in adverse conditions and will be understood by reading and studying the following specification.

In one embodiment, a precision landing system comprises a vehicle. The vehicle includes a receiver configured to receive position information for structures and a landing zone of a landing site. The vehicle further includes at least one processor coupled to a memory, wherein the memory includes three-dimensional geometric structural information for a landing site. The at least one processor is configured to receive the position information from the at least one receiver. The at least one processor is further configured to assign geographical coordinates to the three-dimensional geometric structural information using the position information for the structures and the landing zone of the landing site. The at least one processor is further configured to output the three-dimensional geometric structural information and graphical rendering information. The vehicle further includes a display device, wherein the display device is configured to render and display a three-dimensional representation of the landing site in real-time based on the three-dimension geometric structural information and the graphical rendering information output from the at least one processor.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A-2B illustrate example landing sites for a vehicle utilizing a precision landing system according to embodiments of the present disclosure.

Figure 1:
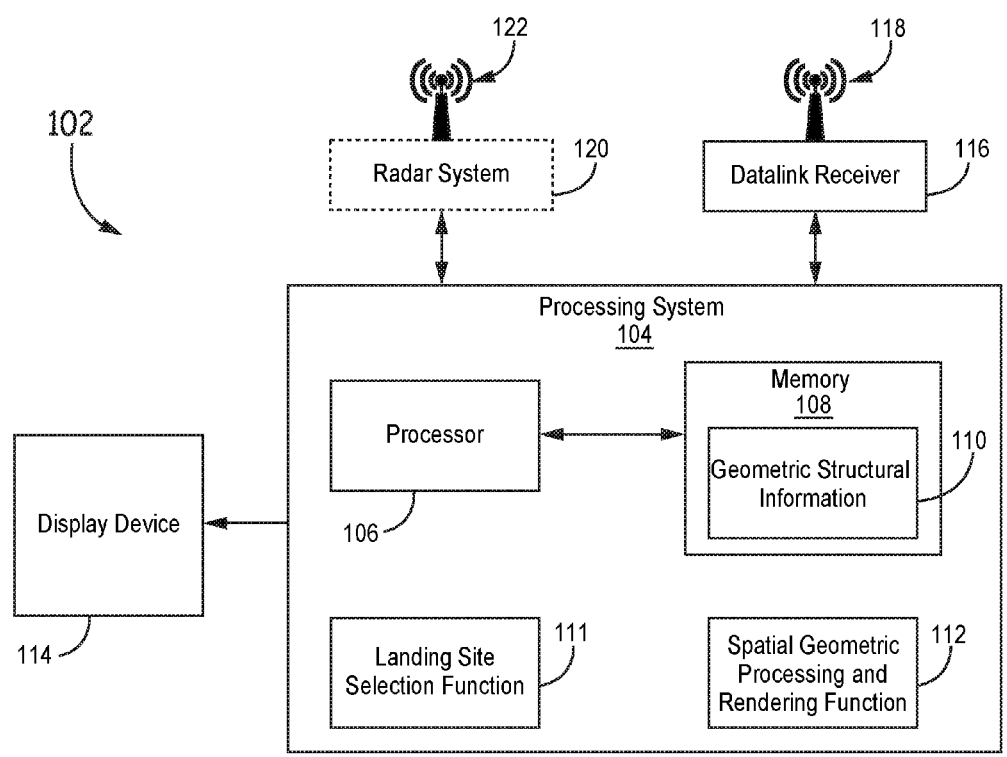
FIGS. 1-1A are diagrams illustrating an example precision landing system according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure provide systems and methods for performing precision landings in adverse conditions. Position information for structures and a landing zone of a landing site is received by the precision landing system and is used to assign geographical coordinates to three-dimensional geometric structural information about the landing site. The systems and methods provide full situational awareness to the pilot or crew by displaying a three-dimensional representation of the landing site on the display device. In particular, the three-dimensional representation of the landing site includes the complete structure of a landing site so a crew can see and avoid obstructions while landing.

Figure 1A:
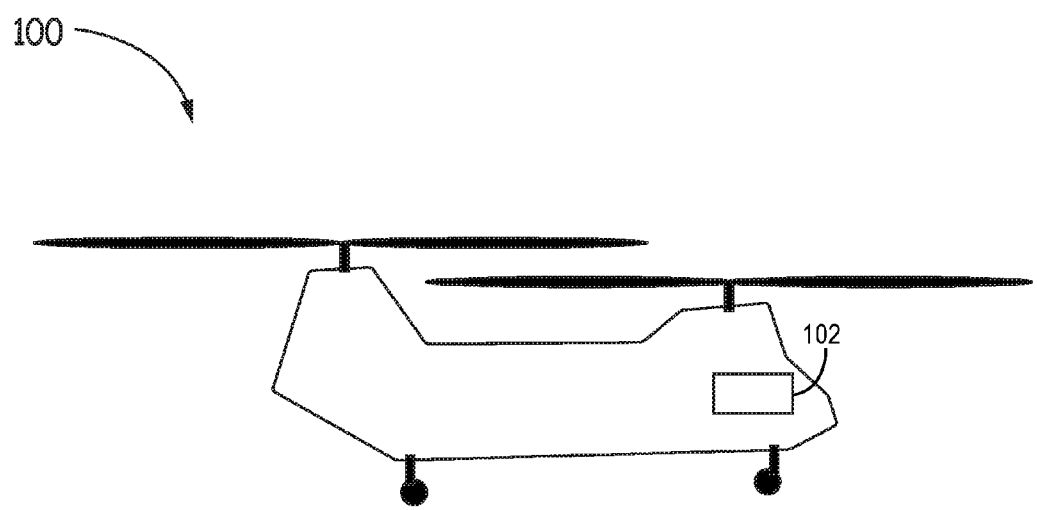

FIGS. 1 and 1A illustrate an example precision on-board landing system 102 for an air-borne vehicle 100 according to one embodiment of the present disclosure. In exemplary embodiments, the vehicle 100 comprises a helicopter, an aircraft, or other vehicle capable of landing with a short approach or landing on a movable landing site. The precision landing system 102 includes an onboard processing system 104, a display device 114, and at least one datalink receiver 116 coupled to an antenna 118. In exemplary embodiments, the at least one datalink receiver 116 comprises a transceiver to enable bi-directional communication. In some embodiments, the precision landing system 102 optionally includes a radar system 120. The radar system 120 includes a transceiver coupled to an antenna 122 for transmitting and receiving radar signals.

The processing system 104 shown in FIG. 1 comprises at least one processor 106 coupled to a memory 108. The at least one processor 106 includes or functions with software programs, firmware, or other computer readable instructions for carrying out various methods, process tasks, calculations, and control functions. The processing system 104 further comprises a landing site selection function 111 and a spatial geometric processing and rendering function 112. These functions may be implemented as computer executable functions or modules executed by the at least one processor 106.

The memory 108 contains geometric structural information 110 for one or more landing sites, which may be stored as a database in memory 108. The geometric structural information 110 is loaded into the memory 108 prior to takeoff and does not change without prior notice to the vehicle 100. In exemplary embodiments, the geometric structural information 110 comprises a spatial geometric database, which is also referred to as a geographic information system (GIS) database. The geometric structural information 110 comprises three-dimensional information regarding the structural features of any potential landing site. For example, in embodiments where the landing site is an oil rig, the geometric structural information 110 may include three-dimensional data (e.g. height, length, width) for the structure of the entire oil rig including the chimneys, cranes, landing zone, etc. and data regarding how those components are positioned with relation to one another. In other words, the geometric structural information 110 is a nominal model of the potential landing sites that includes the physical characteristics of the components of the landing site without specific geographical coordinates. In some embodiments, the geometric structural information 110 further includes the position of the GNSS receivers on the landing site with respect to the structural features and landing zone. For example, the geometric structural information 110 will identify where the GNSS receivers are located on the landing zone and on the structural features of the landing site.

The display device 114 is located within the cockpit of the vehicle 100. As the term is used herein, it should be appreciated that a "cockpit" refers to the vehicle control station from which a driver, pilot, crew, or other operator operates and/or directs operation of the vehicle 100. As the term is used herein, it should be appreciated that "pilot" refers to a driver, pilot, crew, or other operator of the vehicle. In exemplary embodiments, the display device 114 comprises a control display device (CDU), a multifunction control and display device (MCDU), a multi-input interactive display device (MIDU), a multi-function display (MFD), or the like.

While the vehicle 100 is in route to the area of interest that includes the desired landing site, the pilot or an on-board system activates the landing site selection function 111 to access a virtual grid of the area of interest on the display device 114. The area of interest may include one or more of a plurality of potential landing sites stored in memory 108. Once the landing site selection function 111 is activated, display device 114 may graphically display the current position of each of the landing sites in the area of interest. In various potential implementations, the landing sites can be displayed as points, icons, or other appropriate symbols by display device 114. In some embodiments, the pilot of the vehicle 100 selects the desired landing site manually based on her knowledge of the flight destination. In other embodiments, the landing site selection function 111 receives the unique identification signals transmitted from the landing sites along with current position information for the landing site via the datalink receiver 116 and automatically selects the desired landing site. Once the desired landing site is selected, the desired landing site is highlighted, bolded, or otherwise distinguished from the undesired landing sites. The pilot of the vehicle 100 can then adjust course to the desired landing site. For example, in one embodiment in operation, vehicle 100 is a helicopter that is to land on a landing site located on the deck of a ship that is underway. The pilot manually activates the landing site selection function 111 so that the display device 114 reveals potential landing sites within a threshold range of the helicopters current position. The ship with the target landing site is transmitting its unique identification signal along with current position information so that processing system 104 can graphically present the position of the target landing site on display device 114.

Once the vehicle 100 is within a threshold range of the landing site (e.g. within 2 kilometers), the pilot or the processing system 104 can activate the spatial geometric processing and rendering function 112. The spatial geometric processing and rendering function 112 receives position information for structures and the landing zone of the landing site. The spatial geometric processing and rendering function 112 may obtain the position information for the structures and the landing zone of the landing site via the datalink receiver 116 and/or the radar system 120, which are discussed herein with respect to FIGS. 2A-2B.

Figure 2A:
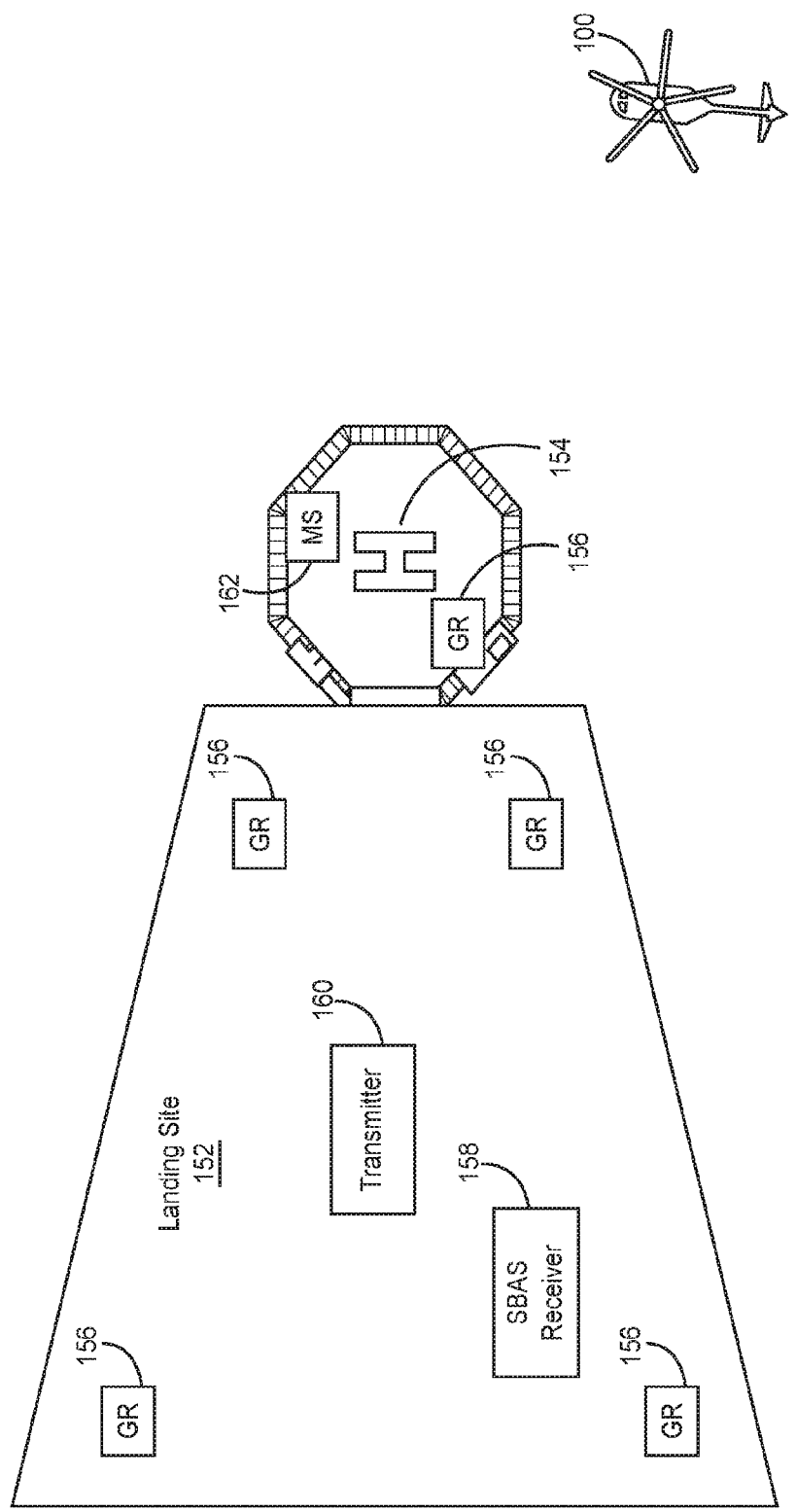

FIG. 2A illustrates an example landing site 152 according to one embodiment of the present disclosure. When approaching landing site 152, the spatial geometric processing and rendering function 112 receives position information via the datalink receiver 116.

In exemplary embodiments, the landing site 152 is movable or moving such that the landing zone 154 location and/or orientation is changing. For example, the landing site 152 may comprise an oil rig, a marine vehicle (e.g. a boat, aircraft carrier, etc.), or other movable landing sites known to one having skill in the art. In exemplary embodiments, the landing zone 154 can be circular, square, or any other suitable shape. The landing site 152 includes one or more GNSS receivers 156 installed throughout the landing site 152. At least one of the GNSS receivers 156 is positioned on the landing zone 154 and the other GNSS receivers 156 can be positioned throughout the landing site 152. For example, the other GNSS receivers 156 can be positioned on elevated structures or movable structures of the landing site 152. In exemplary embodiments, at least four GNSS receivers are installed on the landing zone 154.

The landing site 152 further includes an SBAS receiver 158 communicatively coupled to the GNSS receivers 156. By using SBAS to augment the position information for the GNSS receivers 156, the position of the landing site 152, as well as the structures and the landing zone 154 of the landing site 152, can be more accurately determined. The landing site 152 also includes a transmitter 160 for broadcasting information from the landing site to the vehicle 100. In exemplary embodiments, the transmitter 160 comprises a buoy, a Secondary Surveillance Radar (SSR), a Mode S transponder, an Automatic Dependent Surveillance-Broadcast (ADS-B) transmitter, or the like. Accordingly, the transmitter 160 can be positioned on the landing site 152 or can be positioned within the vicinity of the landing site 152. The transmitter 160 broadcasts the latitude and longitude of the landing site 152 as well as a unique identifier signal. The transmitter 160 also broadcasts the location of the GNSS receivers 156, which comprises the position information for structures and the landing zone 154 of the landing site 152.

The broadcast signals from the transmitter 160 are received by the datalink receiver 116 and are provided as inputs to the processing system 104. In particular, the broadcast signals are input to the spatial geometric processing and rendering function 112 of the processing system 104 to provide position information for the structures and the landing zone 154 of the landing site 152. As discussed above, the GNSS receivers 156 are positioned on the structures and the landing zone 154 of the landing site 152.

The spatial geometric processing and rendering function 112 uses the augmented position information from these GNSS receivers 156 to assign geographical coordinates to the geometric structural information 110 for the landing site 152. For example, latitude and longitude coordinates of the actual GNSS receiver on the landing site will be assigned to the respective GNSS receiver information included in the geometric structural information 110. Once the spatial geometric processing and rendering function 112 assigns the geographical coordinates to a sufficient amount of the geometric structural information 110, the geographical position of the structures of the landing site 152 and the landing zone 154 of the landing site 152 relative to the vehicle 100 is sufficiently correlated in order to display a three-dimensional representation of the landing site 152 on the display device 114. The spatial geometric processing and rendering function 112 outputs the geo-referenced geometric structural information 110 and graphical rendering information to the display device 114. The display device 114 then renders and displays the three-dimensional representation of the landing site the in real-time. In exemplary embodiments, graphical rendering information includes translation information from the geographical coordinates of the landing site to a corresponding screen position on the display device 114, color information, and the like.

In one example embodiment of operation, vehicle 100 is a helicopter that is to land on a landing zone located on an oil rig. Once the geometric structural information of the landing zone on the oil rig is sufficiently correlated with geographical coordinates from the GNSS receivers, the pilot will see a three-dimensional representation of the oil rig displayed on the display device 114. In exemplary embodiments, the display device 114 will display the oil rig from the point of view of the cockpit of the vehicle 100. In other embodiments, a different point of view may be used.

In exemplary embodiments, the landing site 152 further includes a motion sensor 162 that gathers heave, sway, and surge data. In exemplary embodiments, the motion sensor 162 is positioned on the landing zone 154 and is communicatively coupled to the transmitter 160. In such embodiments, the spatial geometric processing and rendering function 112 receives the heave, sway, and surge data from the transmitter 160 and incorporates heave, sway, and surge of the landing site 152 into the information sent to the display device 114. For example, in one embodiment of operation, the display device 114 will display the three-dimensional representation of an oil rig and the representation will include the heave, sway, and surge motion experienced by the oil rig.

FIG. 2B illustrates an example landing site 252 according to one embodiment of the present disclosure. When approaching landing site 252, the spatial geometric processing and rendering function 112 receives position information via the radar system 120. The landing site 252 is similar to landing site 152 discussed above with reference to FIG. 2A. However, the landing zone 254 includes one or more metal reflectors 256 installed on the landing zone 254, but does not include the GNSS receivers 156 or the SBAS receiver 158 as discussed above with respect to FIG. 2A. In exemplary embodiments, the metal reflectors 256 are installed near one or more edges of the landing zone 254 and may substantially cover the outer edge of the landing zone 254.

In the embodiment shown in FIG. 2B, the radar system 120 transmits or emits radar signals and receives radar signals reflected off structures of the landing site 252 and metal reflectors 256 installed on the landing zone 254. The reflected radar signals are received by the radar system 120 and are provided as inputs to the processing system 104. In particular, the reflected radar signals are input to the spatial geometric processing and rendering function 112 of the processing system 104 to provide position information for the structures and the landing zone 254 of the landing site 252. In exemplary embodiments, the spatial geometric processing and rendering function 112 calculates the position of the structures and the landing zone 254 using the reflected radar signals. Once the spatial geometric processing and rendering function 112 has the position information for prominent structures and the landing zone 254 from the reflected radar signals, the spatial geometric processing and rendering function 112 proceeds with assigning geographical coordinates to the geometric structural information 110 and displaying a three-dimensional representation of the landing site 252 in a manner similar to that discussed above with respect to FIG. 2B.

In some embodiments, the radar system 120 comprises a Synthetic Aperture Radar (SAR) system or an Inverse SAR (ISAR) system. A SAR or ISAR system produces a detailed image of the landing site 252. In such embodiments, the spatial geometric processing and rendering function 112 implements image processing techniques to correlate the image of the landing site 252 with the geometric structural information 110 prior to display on the display device 114. In some embodiments, the spatial geometric processing and rendering function 112 uses a bounding box technique for image processing. In particular, the spatial geometric processing and rendering function 112 treats the nominal model (i.e. geometric structural information 110) as simple volume encompassing the structures of the landing site to improve the efficiency of the correlation.

Upon the displaying the three-dimensional representation of the landing site in real-time, the pilot of the vehicle 100 is provided with full situational awareness of the environment of the landing site via display device 114. In particular, the pilot is able to graphically see on display device 114 spatial representations of structural elements present at the entire landing site, including structures that obstruct the path of the vehicle 100 to the landing zone. For example, based on the representations of structural elements presented on display device 114, the pilot may recognize that the current glide path of the vehicle 100 will be unsuitable for approach to the landing zone due to an obstruction. For example, an elevated structure of the landing site could be in the glide path of the vehicle 100. In such embodiments, the pilot may initiate computation of an updated glide path that avoids the obstruction without having to abort the landing.

Also, for moving landing sites, such as an oil rig or marine vehicle, the landing zone location and orientation may be constantly changing. A pilot in a vehicle 100 equipped with the precision landing system 102 described above will be able to observe the location and orientation changes of the landing zone in real-time on the display device 114 and update the glide path to accommodate the changes.

In exemplary embodiments, the implementations discussed above with respect to FIGS. 2A-2B may be combined in a single system. In some embodiments, the above implementations can be used as redundant systems. In other embodiments, the position information can be obtained through reflected radar signals and a broadcast from the transmitter associated with the landing site. In such embodiments, the spatial geographic processing and rendering function 112 will synthesize the position information from both sources prior to geo-referencing the geometric structural information 110.

Figure 3:
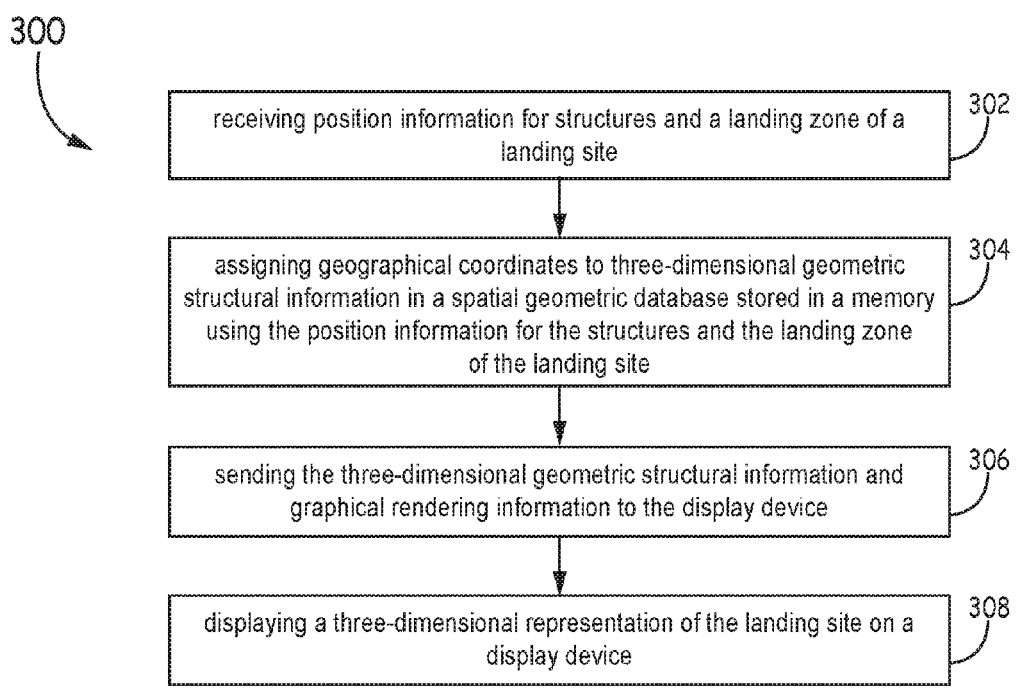
FIG. 3 is a flow chart illustrating a method according to one embodiment of the present disclosure.

FIG. 3 is a flow chart illustrating a method 300 according to one embodiment of the present disclosure. It should be understood that method 300 may be implemented using any of the embodiments described above with respect to FIGS. 1, 1A, 2A and 2B. As such, elements of method 300 may be used in conjunction with, in combination with, or substituted for elements of those embodiments described above. Further, the functions, structures and other description of elements for such embodiments described above may apply to like named elements of method 300 and vice versa.

The method begins at 302 with receiving position information for structures and a landing zone of a landing site. In some embodiments, receiving position information for the structures and the landing zone of the landing site includes receiving the GNSS data for GNSS receivers positioned on the structures and landing zone of the landing site. In exemplary embodiments, receiving position information for structures and a landing zone of a landing site includes receiving radar signals reflected from the structures of the landing site and one or more metal reflectors installed on the landing zone of the landing site. In such embodiments, the method 300 further comprises calculating the position of the structures and the landing zone using the reflected radar signals and synthesizing the calculated positions with the GNSS data. In exemplary embodiments, receiving position information for structures and the landing zone of the landing site further comprises receiving heave, sway, and surge data from a motion sensor on the landing site.

The method proceeds to 304 with assigning geographical coordinates to three-dimensional geometric structural information in a spatial geometric database stored in a memory using the position information for the structures and the landing zone of the landing site. In exemplary embodiments, assigning geographical coordinates to the three-dimensional geometric structural information comprises correlating the GNSS data for the GNSS receivers with a relative position of each GNSS receiver with respect to the structures and the landing zone of the landing site. In such embodiments, the three-dimensional structural information in the spatial geometric database includes details about the relative location of a GNSS receiver on the landing site compared to the structures and other GNSS receivers of the landing site. Accordingly, the entirety of the three-dimensional structural information in the spatial geometric database can be assigned geographical coordinates.

The method proceeds to 306 with sending the three-dimensional geometric structural information and graphical rendering information to the display device. In particular, the three-dimensional geometric structural information with the geographical coordinates is sent to the display device. In exemplary embodiments, the three-dimensional structural information sent to the display device also incorporates heave, sway, and surge data from a motion sensor on the landing site. The graphical rendering information includes translation information from the geographical coordinates of the landing site to a corresponding screen position on the display device, color information, and the like.

The method proceeds to 308 with displaying a three-dimensional representation of the landing site on a display device. The rendering pipeline of the display device receives the three-dimensional geometric structural information with geographical coordinates and the graphical rendering information and renders the three-dimensional representation of the landing site on the screen of the display device in real-time. In exemplary embodiments, the display device will display the landing site from the point of view of the cockpit of the vehicle approaching the landing site. In other embodiments, a different point of view may be used (e.g. the nose or bottom of the vehicle). In exemplary embodiments, the display device will also display the heave, sway, and surge motion of the landing site in real-time based on the heave, sway, and surge data from the motion sensor on the landing site.

It should be understood that the above systems and methods may also be used for takeoffs in adverse weather conditions. Prior to takeoff, the three-dimensional geometric structural information is geo-referenced with position information received from the GNSS receivers and/or reflected radar signals. The pilot can determine the orientation of the vehicle on the landing zone and can adjust the path for takeoff to avoid any structures.

Example Embodiments

Example 1 includes a precision landing system comprising: a vehicle including: at least one receiver configured to receive position information for structures and a landing zone of a landing site; at least one processor coupled to a memory, wherein the memory includes three-dimensional geometric structural information for a landing site, wherein the at least one processor is configured to: receive the position information from the at least one receiver; assign geographical coordinates to the three-dimensional geometric structural information using the position information for the structures and the landing zone of the landing site; output the three-dimensional geometric structural information and graphical rendering information; and a display device, wherein the display device is configured to render and display a three-dimensional representation of the landing site in real-time based on the three-dimension geometric structural information and the graphical rendering information output from the at least one processor.

Example 2 includes the system of Example 1, wherein the position information comprises Global Navigation Satellite System (GNSS) data for one or more GNSS receivers positioned on the structures and the landing zone of the landing site, wherein the at least one receiver is configured to receive the position information from a transmitter associated with the landing site.

Example 3 includes the system of Example 2, wherein the three-dimensional geometric structural information includes a relative position of each of the one or more GNSS receivers with respect to the structures and the landing zone of the landing site, wherein assigning geographical coordinates to the three-dimensional geometric structural information using the position information for the structures and the landing zone of the landing site comprises correlating the GNSS data for the one or more GNSS receivers with the relative position of each of the one or more GNSS receivers with respect to the structures and the landing zone of the landing site.

Example 4 includes the system of any of Examples 2-3, further comprising a radar system including a transceiver, wherein the radar system is configured to transmit radar signals and receive radar signals reflected from the structures of the landing site and one or more metal reflectors installed on the landing zone of the landing site, wherein the at least one processor is configured to calculate position information from the reflected radar signals and synthesize with the GNSS data.

Example 5 includes the system of any of Examples 1-4, wherein the at least one receiver is configured to receive a unique identification signal from the landing site, wherein the at least one receiver selects the landing site as the target landing site from a plurality of possible landing sites based on the unique identification signal.

Example 6 includes the system of Example 5, wherein the target landing site is graphically displayed on the display device.

Example 7 includes the system of any of Examples 1-6, wherein the landing site comprises a moving platform.

Example 8 includes the system of Example 7, wherein the landing site comprises one of an oil rig and a marine vehicle.

Example 9 includes the system of any of Examples 1-8, wherein the vehicle comprises one of a helicopter and an aircraft.

Example 10 includes the system of any of Examples 1-9, wherein the at least one processor is further configured to determine heave, sway, and surge of the landing site based on motion data transmitted from the landing site.

Example 11 includes a method of executing a precision landing comprising: receiving position information for structures and a landing zone of a landing site; assigning geographical coordinates to three-dimensional geometric structural information in a spatial geometric database stored in a memory using the position information for the structures and the landing zone of the landing site; sending the three-dimensional geometric structural information and graphical rendering information to a display device; and displaying a three-dimensional representation of the landing site on the display device.

Example 12 includes the method of Example 11, wherein receiving position information for the structures and the landing zone of the landing site includes receiving Global Navigation Satellite System (GNSS) data for one or more GNSS receivers positioned on the structures and landing zone of the landing site from a transmitter associated with the landing site.

Example 13 includes the method of Example 12, wherein assigning geographical coordinates to the three-dimensional geometric structural information comprises correlating the GNSS data for the one or more GNSS receivers with a relative position of each of the one or more GNSS receiver with respect to the structures and the landing zone of the landing site.

Example 14 includes the method of any of Examples 12-13, wherein receiving position information for structures and the landing zone of the landing site includes receiving radar signals reflected from the structures of the landing site and one or more metal reflectors installed on the landing zone of the landing site.

Example 15 includes the method of Example 14, further comprising synthesizing the position information for the structures and the landing zone of the landing site received from the reflected radar signals and the transmitter associated with the landing site.

Example 16 includes the method of any of Examples 11-15, further comprising: receiving motion data from a motion sensor on the landing site; and rendering heave, sway, and surge of the landing site on the display device based on the motion data.

Example 17 includes a precision landing system comprising: a vehicle including: a radar system including a transceiver, wherein the radar system is configured to transmit radar signals and receive radar signals reflected from structures of a landing site and one or more metal reflectors installed on the landing zone of the landing site; at least one processor coupled to a memory, wherein the memory includes a three-dimensional nominal model of the landing site, wherein the at least one processor is configured to: receive the reflected radar signals from the radar system; correlate the three-dimensional nominal model with the radar signals reflected from the structures and the landing zone of the landing site to assign geographical coordinates to the three-dimensional nominal model for the landing site; and output the correlated three-dimensional nominal model and graphical rendering information; and a display device, wherein the display device is configured to render and display a three-dimensional representation of the landing site in real-time based on the correlated three-dimensional nominal model and the graphical rendering information output from the at least one processor.

Example 18 includes the system of Example 17, wherein the radar system comprises at least one of: a Synthetic Aperture Radar (SAR); and an Inverse SAR (ISAR).

Example 19 includes the system of Example 18, wherein radar system is configured to generate an image of the landing site based on the radar signals reflected from the structures and the landing zone of the landing site.

Example 20 includes the system of Example 19, wherein the three-dimensional nominal model is a volume encompassing the structures of the landing site, wherein correlate the three-dimensional nominal model with the radar signals reflected from the structures and the landing zone of the landing site comprises correlating the image of the landing site with the volume encompassing the structures of the landing site.

In various alternative embodiments, system elements, method steps, or examples described throughout this disclosure (such as the processing system, or sub-parts thereof, for example) may be implemented using one or more computer systems, field programmable gate arrays (FPGAs), or similar devices comprising a processor coupled to a memory (such as shown in FIG. 1, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A precision landing system comprising:
a vehicle including:
at least one receiver configured to receive position information for structures and a landing zone of a landing site;
at least one processor coupled to a memory, wherein the memory includes three-dimensional geometric structural information for a landing site, wherein the at least one processor is configured to:
receive the position information from the at least one receiver;
assign geographical coordinates to the three-dimensional geometric structural information using the position information for the structures and the landing zone of the landing site;

output the three-dimensional geometric structural information and graphical rendering information; and a display device, wherein the display device is configured to render and display a three-dimensional representation of the landing site in real-time based on the three-dimension geometric structural information and the graphical rendering information output from the at least one processor.

2. The system of claim 1, wherein the position information comprises Global Navigation Satellite System (GNSS) data for one or more GNSS receivers positioned on the structures and the landing zone of the landing site, wherein the at least one receiver is configured to receive the position information from a transmitter associated with the landing site.

3. The system of claim 2, wherein the three-dimensional geometric structural information includes a relative position of each of the one or more GNSS receivers with respect to the structures and the landing zone of the landing site, wherein assigning geographical coordinates to the three-dimensional geometric structural information using the position information for the structures and the landing zone of the landing site comprises correlating the GNSS data for the one or more GNSS receivers with the relative position of each of the one or more GNSS receivers with respect to the structures and the landing zone of the landing site.

4. The system of claim 2, further comprising a radar system including a transceiver, wherein the radar system is configured to transmit radar signals and receive radar signals reflected from the structures of the landing site and one or more metal reflectors installed on the landing zone of the landing site, wherein the at least one processor is configured to calculate position information from the reflected radar signals and synthesize with the GNSS data.

5. The system of claim 1, wherein the at least one receiver is configured to receive a unique identification signal from the landing site, wherein the at least one receiver selects the landing site as the target landing site from a plurality of possible landing sites based on the unique identification signal.

6. The system of claim 5, wherein the target landing site is graphically displayed on the display device.

7. The system of claim 1, wherein the landing site comprises a moving platform.

8. The system of claim 7, wherein the landing site comprises one of an oil rig and a marine vehicle.

9. The system of claim 1, wherein the vehicle comprises one of a helicopter and an aircraft.

10. The system of claim 1, wherein the at least one processor is further configured to determine heave, sway, and surge of the landing site based on motion data transmitted from the landing site.

11. A method of executing a precision landing comprising:
receiving position information for structures and a landing zone of a landing site;
assigning geographical coordinates to three-dimensional geometric structural information in a spatial geometric database stored in a memory using the position information for the structures and the landing zone of the landing site;
sending the three-dimensional geometric structural information and graphical rendering information to a display device; and
displaying a three-dimensional representation of the landing site on the display device.

12. The method of claim 11, wherein receiving position information for the structures and the landing zone of the landing site includes receiving Global Navigation Satellite System (GNSS) data for one or more GNSS receivers positioned on the structures and landing zone of the landing site from a transmitter associated with the landing site.

13. The method of claim 12, wherein assigning geographical coordinates to the three-dimensional geometric structural information comprises correlating the GNSS data for the one or more GNSS receivers with a relative position of each of the one or more GNSS receiver with respect to the structures and the landing zone of the landing site.

14. The method of claim 12, wherein receiving position information for structures and the landing zone of the landing site includes receiving radar signals reflected from the structures of the landing site and one or more metal reflectors installed on the landing zone of the landing site.

15. The method of claim 14, further comprising synthesizing the position information for the structures and the landing zone of the landing site received from the reflected radar signals and the transmitter associated with the landing site.

16. The method of claim 11, further comprising:
receiving motion data from a motion sensor on the landing site; and
rendering heave, sway, and surge of the landing site on the display device based on the motion data.

17. A precision landing system comprising:
a vehicle including:
a radar system including a transceiver, wherein the radar system is configured to transmit radar signals and receive radar signals reflected from structures of a landing site and one or more metal reflectors installed on the landing zone of the landing site;
at least one processor coupled to a memory, wherein the memory includes a three-dimensional nominal model of the landing site, wherein the at least one processor is configured to:
receive the reflected radar signals from the radar system;
correlate the three-dimensional nominal model with the radar signals reflected from the structures and the landing zone of the landing site by assigning geographical coordinates to the three-dimensional nominal model for the landing site; and
output the correlated three-dimensional nominal model and graphical rendering information; and
a display device, wherein the display device is configured to render and display a three-dimensional representation of the landing site in real-time based on the correlated three-dimensional nominal model and the graphical rendering information output from the at least one processor.

18. The system of claim 17, wherein the radar system comprises at least one of:
a Synthetic Aperture Radar (SAR); and
an Inverse SAR (ISAR).

19. The system of claim 18, wherein radar system is configured to generate an image of the landing site based on the radar signals reflected from the structures and the landing zone of the landing site.

20. The system of claim 19, wherein the three-dimensional nominal model is a volume encompassing the structures of the landing site, wherein correlate the three-dimensional nominal model with the radar signals reflected from the structures and the landing zone of the landing site comprises correlating the image of the landing site with the volume encompassing the structures of the landing site.

* * * * *